United States Patent [19]

Webb

[11] Patent Number: 5,898,376
[45] Date of Patent: Apr. 27, 1999

[54] MODULAR OVERFILL ALARM ASSEMBLY FOR VENTED STORAGE TANKS

[76] Inventor: R. Michael Webb, 3108 Sherman Ave., Eau Claire, Wis. 54701

[21] Appl. No.: 08/507,090

[22] Filed: Jul. 26, 1995

Related U.S. Application Data

[63] Continuation-in-part of application No. 08/305,430, Sep. 13, 1994, abandoned, which is a continuation of application No. 08/104,995, Aug. 10, 1993, abandoned.

[51] Int. Cl.⁶ ................................................ G08B 21/00
[52] U.S. Cl. .......................... 340/623; 340/612; 340/618; 340/624; 116/110; 73/307
[58] Field of Search ........................... 340/612, 615, 340/618, 623, 624; 116/110, 109, 111, 113; 73/307, 305

[56] References Cited

U.S. PATENT DOCUMENTS

| 2,143,706 | 1/1939 | Mathey | 137/558 |
|---|---|---|---|
| 4,187,503 | 2/1980 | Walton | 340/624 |
| 4,757,305 | 7/1988 | Peso | 340/624 |
| 4,821,022 | 4/1989 | Jannotta | 340/623 |
| 4,924,703 | 5/1990 | White et al. | 340/624 |
| 5,033,637 | 7/1991 | Webb | 220/565 |

OTHER PUBLICATIONS

GEMS® Instruction Bulletin No. 72947, "Installation and Maintenance of Single Station Level Switches", published by IMO Industries, Inc., GEMS Sensors Division, Plainville, CT.
GEMS® Bulletin No. 133702, "Reed Switch Instruction Sheet", published by IMO Industries, Inc., GEMS Sensors Division, Plainville, CT.
GEMS® "Electro–Optic Liquid Level Switch and Controller Information Sheet", published by IMO Industries, Inc., GEMS Sensors Division, Plainville, CT.

Primary Examiner—Edward Lefkowitz
Attorney, Agent, or Firm—Knoble & Yoshida LLC

[57] ABSTRACT

A modular overfill alarm assembly is constructed and arranged to be installed in-line with a vent pipe in a vented storage tank for liquids such as waste oil or gasoline. The alarm assembly includes a vent tube having an open lower end that is threaded to be mounted to a vent opening in a vented storage tank, and an open upper end that is threaded to have a vent pipe mounted thereto, so that the vent pipe may be communicated with the vent opening as it would if it were threaded directly into the opening. The assembly further includes a support bracket mounted to the vent pipe and vent tube for supporting a commercially available alarm for actuating the alarm.

7 Claims, 5 Drawing Sheets

MODULAR OVERFILL ALARM ASSEMBLY FOR VENTED STORAGE TANKS

RELATED APPLICATION DATA

This application is a continuation-in-part of Ser. No. 08/305,430,filed on Sep. 13, 1994, now abandoned, which is a continuation of Ser. No. 08/104,995, filed on Aug. 10, 1993, now abandoned.

BACKGROUND OF THE INVENTION

1. Field of the Invention

This invention relates to an overfill alarm assembly for a storage tank. More specifically, an assembly according to the invention is configured to be installed as an in-line module with a vent pipe in a vented storage tank for liquids such as waste oil or gasoline.

2. Description of the Prior Art

In large tanks of the type that are used to store expandable liquids such as waste oil or gasoline, such as the tank disclosed in U.S. Pat. No. 5,033,637 to Webb, it is desirable to provide a vent pipe for preventing excessive pressure build-up within the tank. Venting is required in practically all states and countries.

It is further desirable in such systems to have some type of system for indicating when the liquid within the storage tank reaches a predetermined level. With such an indicating system, overfilling of the storage tank can be prevented.

To mount a vent pipe or an overfill sensing system to a storage tank, it is typically necessary to form a number of threaded openings in a top surface of the tank. However, it is generally recognized that the number of holes or openings in the tank should be kept to a minimum, particularly when storing volatile substances such as gasoline or kerosene.

Most storage tanks presently in use include a vent pipe that is threaded into an opening in the top surface of the storage tank, but do not include an overfill indicating system. It is clear that there is a need in the prior art for an overfill sensing and alarm assembly that could be used in such systems without the necessity for forming an additional hole in the storage tank.

SUMMARY OF THE INVENTION

It is an object of the invention to provide a modular overfill alarm assembly that is constructed and arranged to be installed in-line with a vent pipe in a vented storage tank for liquids, so that, among other advantages, an overfill condition can be sensed without forming an additional hole in the storage tank.

In order to achieve the above and other objects of the invention, a modular overfill alarm assembly that is constructed and arranged to be installed in-line with a vent pipe in a vented storage tank for liquids includes, according to a first aspect of the invention, a vent tube having an open lower end that is constructed and arranged to be mounted to a vent opening in a vented storage tank, and an open upper end that is constructed and arranged to have a vent pipe mounted thereto, whereby the vent pipe may be communicated with the vent opening; a support bracket mounted to the vent tube for supporting a commercially available air horn of the type that includes a compressed gas cartridge and a sound generating portion; a float member; and a linkage attached to the float member for actuating an air horn in the support bracket when the float member rises above a predetermined level, the linkage being at least partially positioned within the vent tube, whereby the tank may be vented and the level of liquid therein monitored through a single opening in the tank.

According to a second aspect of the invention, a modular overfill alarm assembly that is constructed and arranged to be installed in-line with a vent pipe in a vented storage tank for liquids includes a vent tube having an open lower end that is threaded to be mounted to a vent opening in a vented storage tank, and an open upper end that is threaded to have a vent pipe mounted thereto, whereby the vent pipe may be communicated with the vent opening; a support bracket mounted to the vent tube for supporting a commercially available air horn of the type that includes a compressed gas cartridge and a sound generating portion; a float member; a linkage for actuating an air horn in the support bracket when the float member rises above a predetermined level, the linkage including a push rod positioned at least partially within the vent tube, the push rod being connected to the float member at a lower end thereof, and an activator arm having a middle portion thereof pivotally mounted to said bracket and a first end pivotally mounted to said push rod, whereby a second opposite end of the activator arm is urged downwardly toward an actuator button on the air horn when the push rod is lifted by the float; and a biasing system for urging the linkage toward actuating the air horn, the biasing system including a tension spring mounted at a first end to the vent tube and at a second end to the push rod.

According to a third aspect of the invention, a modular overfill alarm assembly that is constructed and arranged to be installed in-line with a vent pipe in a vented storage tank for liquids includes a vent tube having an open lower end that is threaded to be mounted to a vent opening in a vented storage tank, an open upper end that is threaded to have a vent pipe mounted thereto, whereby the vent pipe may be communicated with the vent opening, and an opening on a tube wall; a support bracket mounted on an outside surface of said vent tube for housing an electric alarm including a circuit board with a microprocessor, a battery and a buzzer interconnected for sound; an electrical conduit assembly positioned within the vent tube such that the tank may be vented and the level of the fluid therein may be monitored through a single opening in a tank, the electrical conduit assembly including an electrical conduit shaft having a top end and a lower end; a sensor wire having opposite ends coupled to the conduit shaft top end and to the electric alarm; and a means for closing a circuit to activate a signal to trigger the electric alarm when the fluid reaches a predetermined level.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
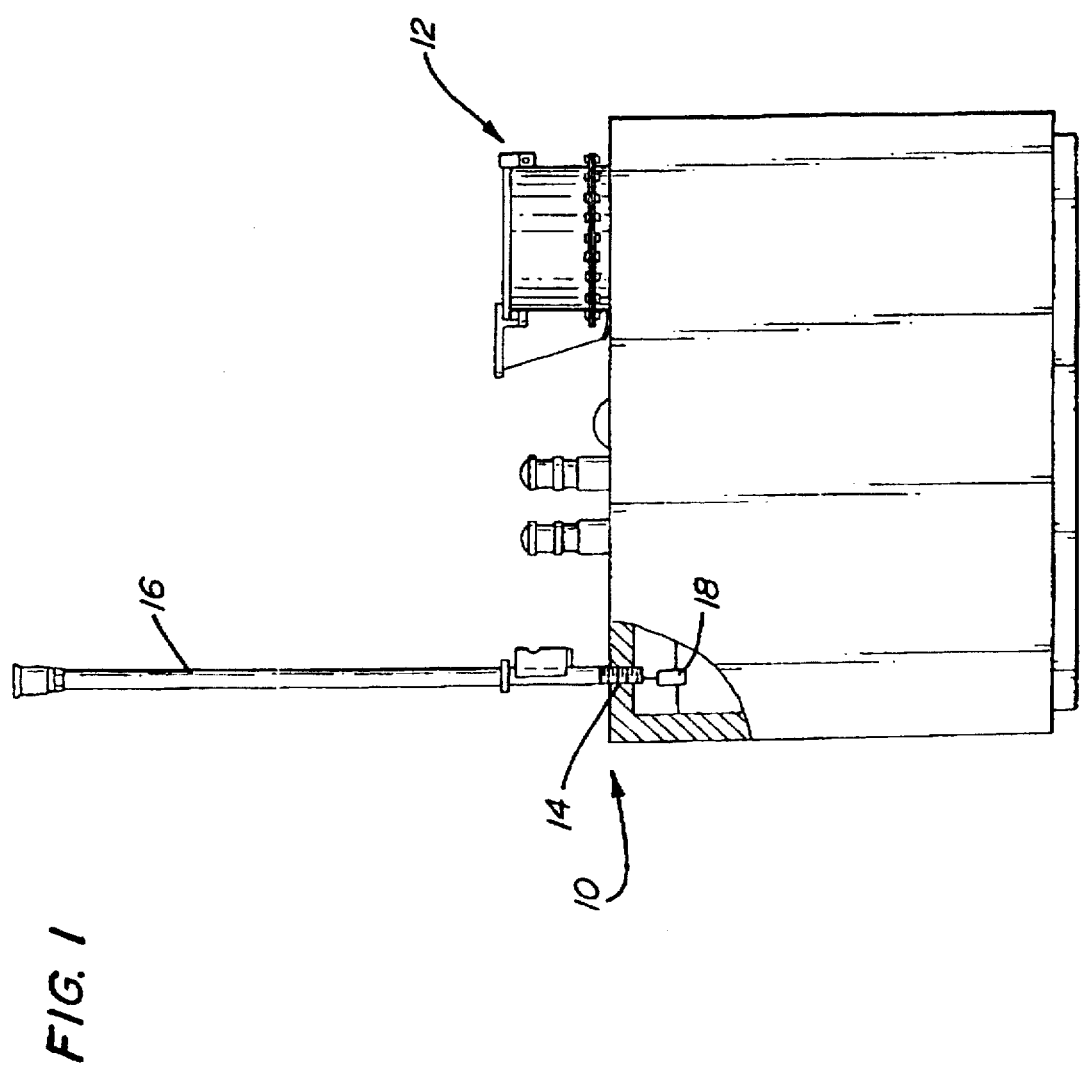
FIG. 1 is a fragmentary view of a storage tank system incorporating a modular overfill alarm assembly according to a preferred embodiment of the invention.

Referring now to the drawings, wherein like reference numerals designate corresponding structure throughout the views, and referring in particular to FIG. 1, a modular overfill alarm assembly 10, according to a preferred embodiment of the invention, is shown mounted to a vented liquid storage tank 12. As may be seen in FIG. 1, storage tank 12 has a threaded opening 14 therein that is provided for receiving a threaded end of a vent pipe 16. Modular overfill alarm assembly 10 includes a float member 18 that is positionable within storage tank 12 and is constructed to float upon the surface of any liquid that is being stored within storage tank 12.

Figure 2:
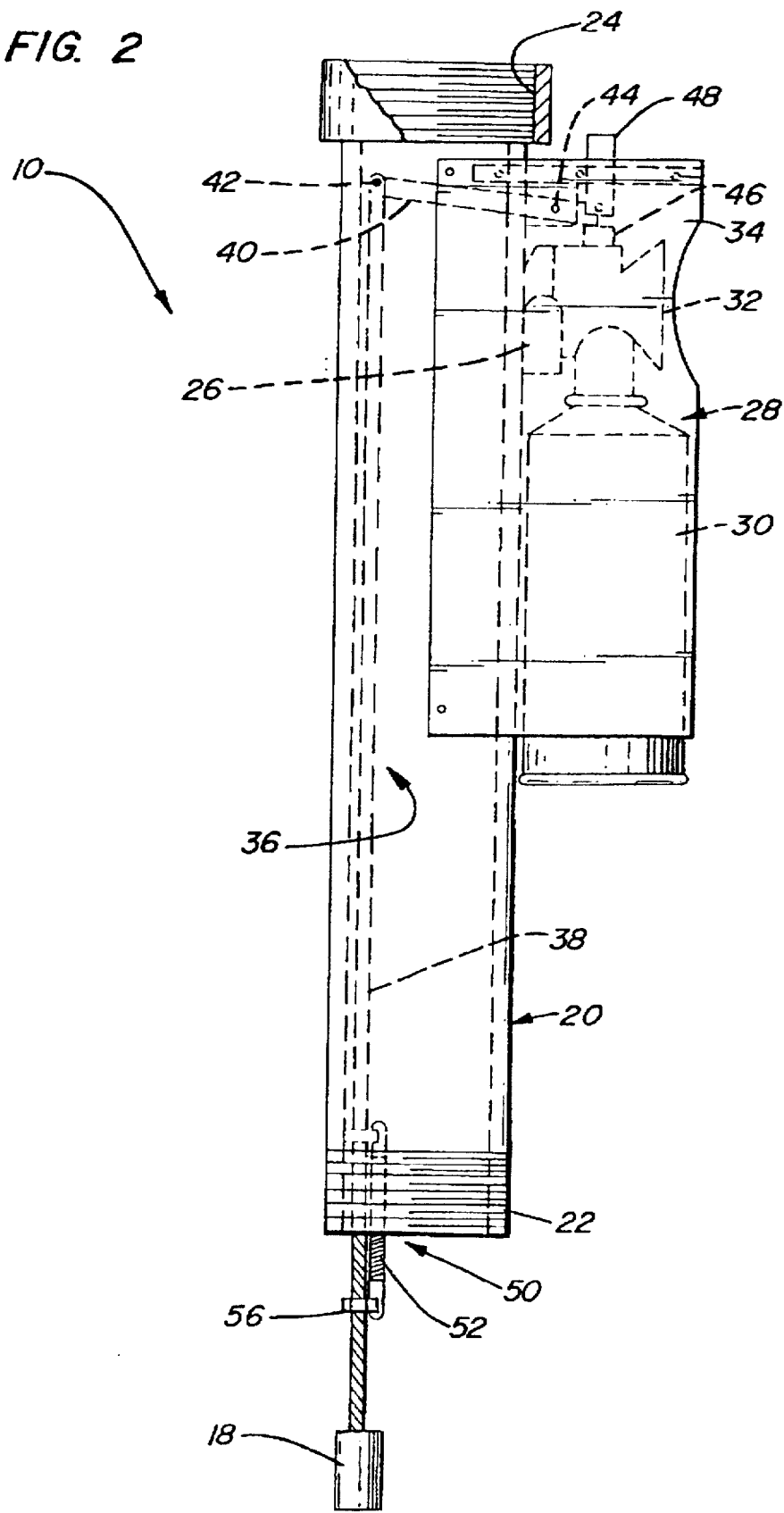
FIG. 2 is a cross-sectional view of the modular overfill alarm assembly according to the embodiment depicted in FIG. 1.

Referring now to FIG. 2, modular overfill alarm assembly 10 preferably includes a vent tube 20 that has an open lower threaded end 22 and an open upper threaded end 24. In the preferred embodiment, lower threaded end 22 has a male threading, and is sized to be threaded into the threaded opening 14 in storage tank 12 that is provided for the vent pipe 16. Upper threaded end 24 has a female threading, and is sized to receive the threaded end of vent pipe 16 that would ordinarily be threaded into the opening 14 in storage tank 12. Accordingly, vent tube 20 is constructed and arranged to be installed in-line with vent pipe 16 in communication with the interior of storage tank 12.

Referring again to FIG. 2, alarm assembly 10 further includes a support bracket 26 that is mounted to vent tube 20 for supporting a commercially available air horn 28 of the type that includes a compressed gas cartridge 30 and a sound generating portion 32. For example, air horn 28 may be that which is commercially available under the trademark BOATMATE from the L. S. Brown Co. of Atlanta, Ga. A cowling 34 is also mounted to vent tube 20 for surrounding air horn 28 and protecting air horn 28 from accidental contact with external forces and the weather. Support bracket 26 is, as may be seen in FIG. 2, designed to support the sound generating portion 32 of air horn 28. Cowling 34 is open at a bottom end so that compressed gas cartridge 30 can be grasped and removed and a new one installed after prolonged periods of use.

Referring again to FIG. 2, alarm assembly 10 further includes a linkage system 36 attached to float member 18 for actuating air horn 28 in support bracket 26 when the float member 18 rises above a predetermined level. As may be seen in FIG. 2, linkage system 26 is partially positioned within vent tube 20, so that the level of liquid in storage tank 12 can be monitored through the single, threaded opening 14 in a top surface thereof.

Specifically, linkage system 36 includes a threaded push rod 38 that is mounted to float member 18 at a lower end thereof. A second, upper end of threaded push rod 38 is mounted to an actuator arm 40 by means of a pivot point 42. A midsection of activator arm 40 is mounted to cowling 34 or support bracket 26 by a pivot point 44. A second end of activator arm 40 that is opposite the first end connected to push rod 38 by pivot point 42 is positioned adjacent to and actuator button 46 on the sound generating portion 32 of air horn 28. When float member 18 is urged upwardly by rising liquid level in storage tank 12, push rod 38 is pushed upwardly within the vent tube 20, urging the first end of actuator arm 40 upwardly, thereby pivoting the actuator arm 40 in a clockwise direction about pivot point 44. This, in turn, causes the second end of actuator arm 40 to depress actuator button 46, thereby sounding air horn 28. A test button 48 is also provided in the cowling 44 for urging the second end of actuator arm 40 downwardly against the actuator button 46. By depressing test button 48, an operator can determine whether air horn 28 is operative, or if cartridge 30 needs to be replaced.

Referring again to FIG. 3, a biasing system 50 is provided for urging the linkage system 36 toward actuating the air horn 28. In many instances, the force that is provided by the upward urging of float member 18 may be insufficient to depress actuator button 46 via the linkage system 36. The purpose of biasing system 50 is to provide additional force to complement the upward urging from float member 18, so that actuation of air horn 28 in overfill conditions is assured. In the preferred embodiment, biasing system 50 includes a lug 54 that is mounted to an inside surface of vent tube 20, a nut 56 that is threaded onto a lower portion of threaded push rod 38, and a tension spring 52 that is connected at a first end to lug 54 and at a second end to nut 56. By adjusting the position of nut 56 on the push rod 38, the force provided by biasing system 50 can be adjusted.

Figure 3:
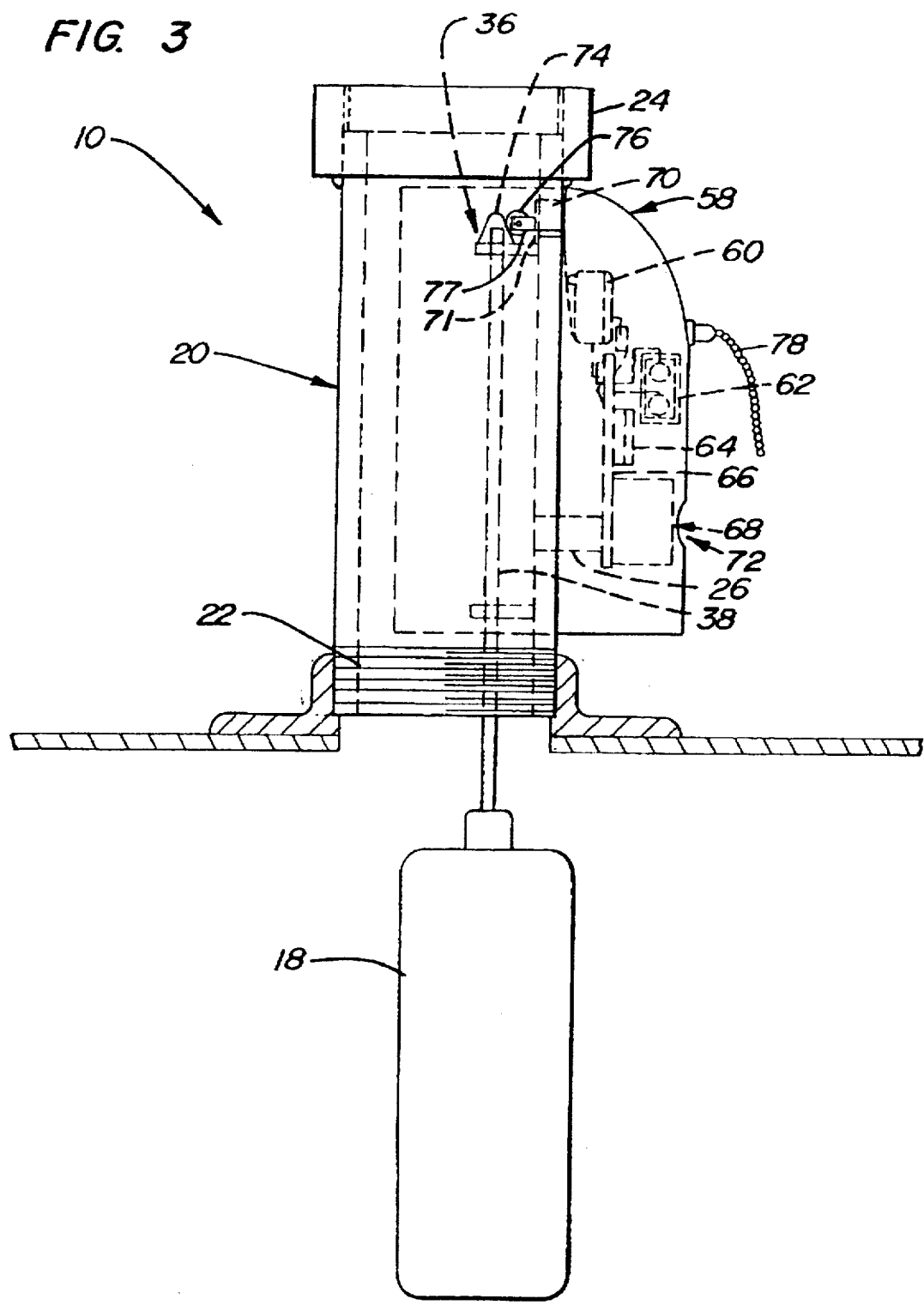
FIG. 3 is a cross-sectional view of a second modular overfill alarm assembly to be installed on the storage tank shown in FIG. 1.

Referring to FIG. 3, a modular overfill alarm assembly 10, according to an alternative embodiment of the invention, preferably includes a vent tube 20 that has an open lower sweated end 22 and an open upper sweated end 24. In the second embodiment, lower threaded end 22 has a male threading, and is sized to be threaded into the threaded opening 14 in storage tank 12 that is provided for the vent pipe 16. Upper threaded end 24 has a female threading, and is sized to receive the threaded end of vent pipe 16 that would ordinarily be threaded into the opening 14 in storage tank 12. Accordingly, vent tube 20 is constructed and arranged to be installed in-line with vent pipe 16 in communication with the interior of storage tank 12.

Referring again to FIG. 3, alarm assembly 10 further includes a support bracket 26 that is mounted on the outer surface of the vent tube 20 for supporting an alarm housing unit 58 which houses the components of the tank alarm assembly. The tank alarm assembly includes a microswitch 60, a 9-volt battery 62, computer chip 64, a circuit board 66, and a pizzo buzzer 68. The housing unit 58 has a removable plastic cover 70 at the top and sound transmitting hole 72 near pizzo buzzer 68.

Referring again to FIG. 3, alarm assembly 10 further includes a linkage system 36 attached to float member 18 for actuating pizzo buzzer 68 when the float member 18 rises above a pre-determined level. As may be seen in FIG. 3, linkage system 36 is partially positioned within vent tube 20, so that the level of liquid in storage tank 12 can be monitored through the single, threaded opening 14 in a top surface thereof.

Specifically, linkage system 36 includes a push rod 38 that is mounted to float member 18 at the lower end thereof. A triangular rubber cam piece is mounted on the second upper end of push rod 38. Adjacent to triangular rubber piece 74, a circular microswitch is placed for detecting upward movement of push rod 38. When the float member 18 rises above a pre-determined level, the triangular rubber piece 74 urges against circular microswitch 76 to activate microswitch 60. The activation in turn causes the activation of sound by pizzo buzzer 68 for audible sound, and the sound continues until the 9-volt battery runs out or the operator shuts it off. A test switch 78 is also provided on the outer surface of the assembly housing for testing the integrity of the alarm assembly system. By pulling a chain of test switch 78, an operator can determine whether the tank alarm assembly system is operative, or if 9-volt battery 62 needs to be replaced.

The tank alarm assembly system as disclosed in FIG. 3 offers additional advantages over the air horn based alarm system as shown in FIG. 2. These additional advantages include increased reliability for detecting an overfill condition, easier installation, and reduced overall size of the alarm assembly system. Unlike the linkage system that involves at least two separate moving parts as shown in FIG. 2, the second alternative embodiment as shown in FIG. 3 involves only one piece of rod 38. This is especially advantageous for operation under cold temperature that might freeze pivots 42 and 44 of the moving parts. In addition, the use of microswitch increases sensitivity for detecting a small amount of movement caused by float member 18. This increased sensitivity substantially eliminates cumbersome initial adjustments of the float member. In contrast, the air horn based system as shown in FIG. 2 requires in general a larger float member 18 so as to cause a stronger physical force upon the air release button of the compressed air cartridge. Lastly, because of the compact electrical components, the overall size of the alarm assembly system is also reduced.

The use of electrical-based tank alarm assembly system as shown in FIG. 3 is intrinsically safe, meaning that the electrical alarm assembly system can be used in a highly combustible environment. The current produced by a 9-volt battery is so limited that no risk for explosion of highly combustible material exists.

The circular microswitch 76 is disposed in the vent tube 20 through an opening provided on the side wall of the vent tube 20 and another part of the microswitch 60 is placed in the alarm assembly housing.

Referring to FIG. 3, computer chip 64 on circuit board 66 provides programmable features of the alarm system. Exemplary programmable features include monitoring of battery for notifying the operator by a sound or light about low battery condition. Another programmable feature may include a programming or selecting pattern of alarm sounds. These features are exemplary and the microprocessor can be programmed to include other features of the operation.

In addition, the above-described electric tank alarm assembly can be applied for leakage detection. In order to detect any leakage at a desirable location around the tank, an electric tank alarm assembly of the current invention is mounted on the outside surface of the container, and the container is placed near a desired location for leakage detection. When leakage occurs and the liquid is collected into the pan, the float rises above a pre-determined level and activates a microswitch by means of a push rod so as to notify an operator of the leakage. The electric tank alarm assembly of the current invention may be also placed in an interstitial space between the two tanks for leakage detection. Again, when the leakage occurs into the interstitial space, float rises to a predetermined level to activate alarm system for leakage detection. These and other applications of the electric tank alarm assembly of the current invention are well within the spirit of the current invention.

Figure 4:
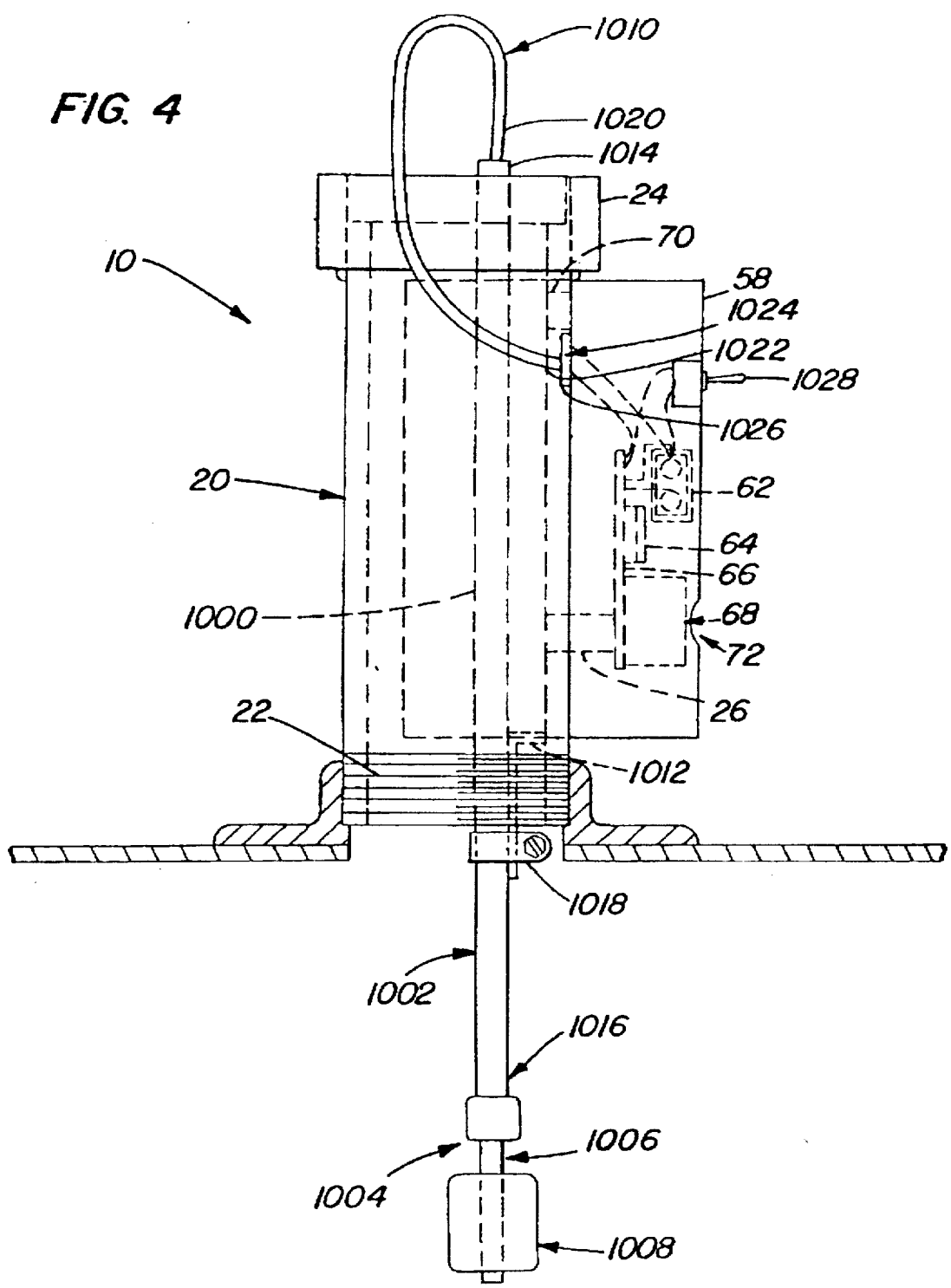
FIG. 4, is a cross-sectional view of another modular overfill alarm assembly to be installed on the storage tank shown in FIG. 1.

Referring to FIG. 4, a modular overfill alarm assembly 10, according to an alternative embodiment of the invention, preferably includes a vent tube 20 that has an open lower threaded end 22 and an open upper threaded end 24. In this embodiment, lower threaded end 22 has a male threading, and is sized to be threaded into the threaded opening 14 in storage tank 12 that is provided for the vent pipe 16. Upper threaded end 24 has a female threading, and is sized to receive the threaded end of vent pipe 16 that would ordinarily be threaded into the opening 14 in storage tank 12. Accordingly, vent tube 20 is constructed and arranged to be installed in-line with vent pipe 16 in communication with the interior of storage tank 12.

Referring again to FIG. 4, the alarm assembly 10 further includes a support bracket 26 that is mounted on the outer surface of the vent tube 20 for supporting an alarm housing unit 58 which houses the components of the tank alarm assembly. The tank alarm assembly includes a 9-volt battery 62, computer chip 64, a circuit board 66, and a pizzo buzzer 68. The housing unit 58 has a removable plastic cover 70 at the top and sound transmitting hole 72 near pizzo buzzer 68.

Figure 5:
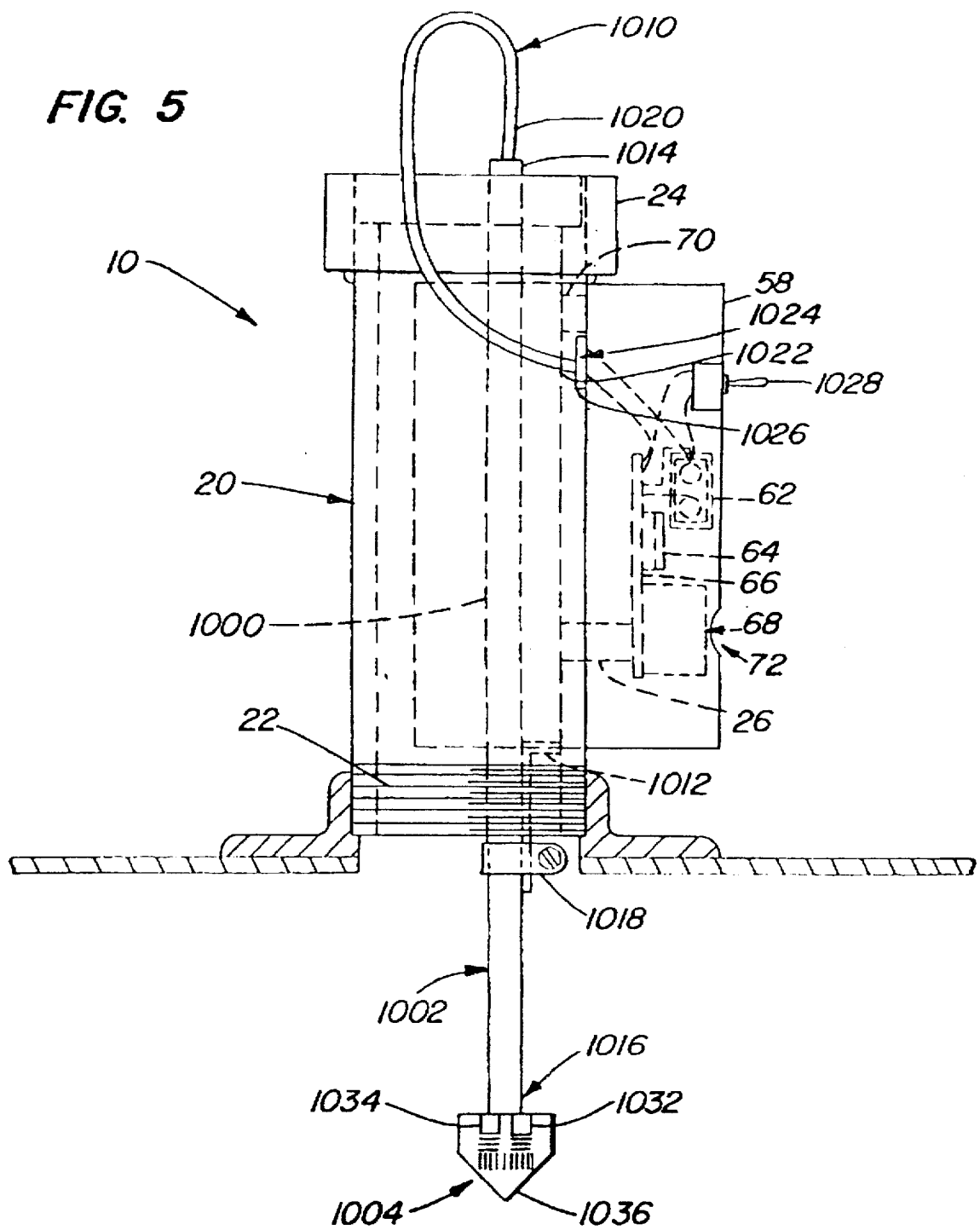
FIG. 5, is a cross-sectional view of another modular overfill alarm assembly to be installed on the storage tank shown in FIG. 1.

Referring again to FIG. 4, alarm assembly 10 further includes an electrical conduit system 1000 which comprises an electrical conduit shaft 1002; a sensor wire 1010; and a means for closing a circuit 1004 for activating a signal to trigger the electric sound generating mechanism when the fluid reaches a predetermined level coupled to the electrical conduit shaft lower end. One such means for closing the circuit is a commercially available level switch, such as a GEMS trademark Single Station Level Switch, consisting of a reed switch rod 1006 and float switch member 1008. As shown in FIG. 5, another means for closing a circuit that can be applied is an optical level sensor 1030, such as the commercially available GEMS trademark Electro-Optic Liquid Level Switch, which comprises an infrared LED 1032 and light receiver 1034.

The electrical conduit shaft 1002 which can be any sturdy or rigid material such as metal, a strong plastic and the like, can be either permanently or adjustably mounted to a bracket 1012 within vent tube 20, so that the level of liquid in the storage tank 12 can be monitored through the single threaded opening 14 in the top surface thereof. The electrical conduit shaft 1002 has a top end 1014 which is accessible from outside the tank 12 while the lower end 1016 is positioned inside the tank where the fluid is contained. The electrical conduit shaft 1002 can be adjustably positioned to measure different capacity levels within the tank, by an adjustable locking means 1018 such as an adjustable clamp, a hose clamp, ridges formed on the shaft acting as stops or steps along the bracket, threads on the shaft and bracket to allow the conduit shaft to be lowered and raised as desired, and the like, can be attached to the bracket 1012.

Again looking at FIG. 4, the reed switch rod 1006 is attached to the electrical shaft lower end 1016. The float switch member 1008 is floatably attached to the reed switch rod 1006 so that it can move up and down along the reed switch rod as the fluid level changes. The reed switch rod 1006 is protectively coated or sealed to prevent damage or corrosion due to the fluid inside the tank, and/or other elements that could damage it. The sensor wire 1010, having two ends 1020 and 1022, has one end 1020 sealed within the electrical conduit shaft and the second end 1022 coupled to the pizzo buzzer 68. The sensor wire can be coupled to the buzzer 68 in different ways, such as extending through the alarm assembly housing, or as shown in FIG. 4, extending through an exit hole 1024 within pipe 20 and coupled to the pizzo buzzer 68. The sensor wire may have a chemical resistant protective coating. As shown in FIG. 4, a fluid tight seal 1026 is placed around exit hole 1024 to prevent fluid from flowing through the exit hole 1024 into the alarm assembly.

The pizzo buzzer 68 is actuated when the float switch member 1008 rises above a pre-determined level on the reed switch rod to complete an electrical circuit to activate the alarm. After the alarm is activated it can be deactivated by switching an on/off switch 1026. In addition, the on/off switch 1026 can be switched on to test whether the battery is still charged.

Looking at FIG. 5, the optical level sensor 1030 is attached to the electric conduit shaft lower end 1016. The sensor wire 1010, having two ends 1020 and 1022, has one end 1020 sealed within the electrical conduit shaft and the second end 1022 coupled to the pizzo buzzer 68. The sensor wire can be coupled to the buzzer 68 in different ways, such as extending through the alarm assembly housing, or as shown in FIG. 5, extending through an exit hole 1024 within pipe 20 and coupled to the pizzo buzzer 68. The sensor wire may have a chemical resistant protective coating. As shown in FIG. 5, a fluid tight seal 1026 is placed around exit hole 1024 to prevent fluid from flowing through the exit hole 1024 into the alarm assembly.

Referring to FIG. 5, the pizzo buzzer 68 is activated with an optical level sensor. As shown, light from the LED 1032 is directed into a prism 1036 which forms the tip of the sensor. With no liquid present, light from the LED 1032 is reflected within the prism 1036 to the receiver 1034. When rising liquid immerses the prism, the light is refracted out into the liquid leaving little or no light to reach the receiver. Sensing this change, the receiver actuates the electronic switching within the unit to trigger the pizzo buzzer.

Referring to FIGS. 4 and 5, computer chip 64 on circuit board 66 provides programmable features of the alarm system. Exemplary programmable features include monitoring of battery for notifying the operator by a sound or light about low battery condition. Another programmable feature may include a programming or selecting pattern of alarm sounds. These features are exemplary and the microprocessor can be programmed to include other features of the operation.

In addition, the above described electric tank alarm assembly can be applied for leakage detection. In order to detect any leakage at a desirable location around the tank, an electric tank alarm assembly of the current invention is mounted on the outside surface of the container, and the container is placed near a desired location for leakage detection. When leakage occurs and the liquid is collected into the pan, the optical level sensor prism is immersed or the float rises above a pre-determined level closing the electric circuit and activates the alarm to notify an operator of the leakage. The electric tank alarm assembly of the current invention may be also placed in an interstitial space between the two tanks for leakage detection. Again, when the leakage occurs into the interstitial space, the optical level sensor prism is immersed or the float rises to a predetermined level to activate alarm system for leakage detection. These and other applications of the electric tank alarm assembly of the current invention are well within the spirit of the current invention.

The tank alarm assembly system as disclosed in FIGS. 4 and 5 offer additional advantages over the air horn based alarm system as shown in FIGS. 2 and 3. These additional advantages include increased reliability for detecting an overfill condition, easier installation, and reduced overall size of the alarm assembly system. Unlike the linkage system that involves at least two separate moving parts as shown in FIG. 2, the alternative embodiment as shown in FIG. 4 does not have any rods or linkages. In contrast, the air horn based system as shown in FIG. 2 requires in general a larger float member 18 so as to cause a stronger physical force upon the air release button of the compressed air cartridge. Lastly, because of the compact electrical components, the overall size of the alarm assembly system is also reduced.

The use of electrical-based tank alarm assembly system as shown in FIGS. 4 and 5 are intrinsically safe, meaning that the electrical alarm assembly system can be used in a highly combustible environment. The current produced by a 9-volt battery is so limited that no risk for explosion of highly combustible material exists.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A modular overfill alarm assembly that is constructed and arranged to be installed in-line with a vent in a vented storage tank for liquids, comprising:

a vent tube having an open lower end that is constructed and arranged to be mounted to communicate with a vent opening in a vented storage tank, and an open upper end that is constructed and arranged to communicate with a vented area, whereby said assembly is mountable in line between a tank and a vent; a sensing means for sensing a level of liquid within the storage tank;

an electric sound generating mechanism that is sufficiently loud enough to be heard during filling of a tank;

support means connected to said vent tube for housing said electric sound generating mechanism when said level reaches a predetermined level; and an intrinsically safe self-contained power source that is sufficient for powering said sensing means and said electric sound generating mechanism, said power source being limited so that no risk of explosion of highly combustible liquid is presented, whereby the tank may be vented and the level of liquid therein monitored through a single opening in the tank without the need for bulky explosion proof electrical insulation.

2. An assembly according to claim 1, further comprising means for signaling when said power source is becoming depleted.

3. An assembly according to claim 1, wherein said sensing means is position adjustable.

4. An assembly according to claim 1 wherein the electrical sound generating mechanism further comprises a battery, a circuit board with a microprocessor and a buzzer.

5. An assembly according to claim 4 wherein said sensing device means has a contact portion that is positionable within the tank.

6. An assembly according to claim 4, wherein said microprocessor is programmable for monitoring and notifying an operator for a low battery condition.

7. An assembly according to claim 4, wherein said microprocessor is programmable for varying a pattern and volume of an output of the electric sound generating mechanism.

* * * * *